United States Patent
Wendling

(10) Patent No.: US 11,932,470 B2
(45) Date of Patent: Mar. 19, 2024

(54) DEVICE FOR SECURING A BOTTLE'S CAP, CORRESPONDING METHOD AND COMPUTER PROGRAM PRODUCT

(71) Applicant: NAGRAVISION S.A., Cheseaux-sur-Lausanne (CH)

(72) Inventor: Bertrand Wendling, Cheseaux-sur-Lausanne (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 73 days.

(21) Appl. No.: 17/647,050

(22) Filed: Jan. 5, 2022

(65) Prior Publication Data
US 2022/0212845 A1  Jul. 7, 2022

(30) Foreign Application Priority Data
Jan. 6, 2021 (EP) .................................... 21150391

(51) Int. Cl.
*B65D 55/02* (2006.01)
*B65D 55/06* (2006.01)

(52) U.S. Cl.
CPC ............ *B65D 55/02* (2013.01); *B65D 55/028* (2013.01); *B65D 55/06* (2013.01); *B65D 2203/10* (2013.01); *B65D 2401/15* (2020.05)

(58) Field of Classification Search
CPC ...... B65D 55/00; B65D 55/02; B65D 55/028; B65D 55/06; B65D 55/08; B65D 55/0854; B65D 55/0863; B65D 81/20; B65D 81/2038; B01F 23/231; B01F 23/236
See application file for complete search history.

(56) References Cited

U.S. PATENT DOCUMENTS

| | | | |
|---|---|---|---|
| 7,705,734 B2 | 4/2010 | Martinelli | |
| 2017/0297790 A1* | 10/2017 | Porte | B65D 55/02 |
| 2020/0391925 A1* | 12/2020 | Marantis | A61J 1/1412 |
| 2022/0410086 A1* | 12/2022 | Borjanin | B65D 81/2038 |
| 2023/0061991 A1* | 3/2023 | Frey | B65D 55/06 |

FOREIGN PATENT DOCUMENTS

WO  WO 2020/150771 A1  7/2020

OTHER PUBLICATIONS

NPL Search (May 12, 2023).*
Extended European Search Report dated Sep. 2, 2021 in European Application 21150391.7 filed on Jan. 6, 2021, 7 pages (with Written Opinion).

* cited by examiner

*Primary Examiner* — Van T Trieu
(74) *Attorney, Agent, or Firm* — Oblon, McClelland, Maier & Neustadt, L.L.P.

(57) ABSTRACT

A device for securing a bottle's cap includes a first part; a second part mechanically connected to the first part through a mechanical connection; and a securing component including a radio frequency transponder, a first portion of the component being implemented in the first part of the device, a second portion of the component being implemented in the second part of the device, at least one portion of the component extending through the mechanical connection. The second part includes a device for fixing the device to a cap of a bottle. The mechanical connection is configured for breaking when a traction or a torsion is applied on the first part of the device versus the second part.

14 Claims, 3 Drawing Sheets

DEVICE FOR SECURING A BOTTLE'S CAP, CORRESPONDING METHOD AND COMPUTER PROGRAM PRODUCT

1. FIELD OF THE DISCLOSURE

The field of the disclosure is that of the securing of bottles' caps, in particular for ensuring the integrity of the content of such bottles.

More specifically, the disclosure relates to a device to be implemented in a bottle's cap for ensuring the integrity of the content of the bottle.

The disclosure can be of interest in any field where there is a need for preventing from counterfeiting contents embedded in bottles. This is the case for instance for high-end wines or spirits, but also for luxury or pharmacology goods.

2. TECHNOLOGICAL BACKGROUND

Bottles are known for packaging a liquid or a cream in the fields of cosmetics, perfumery or pharmacy. Glass bottles are, for example, also used to receive wines or spirits.

Such bottles generally comprise a body defining an internal volume called a reservoir, for packaging the product, this body being extended by a neck, the upper free end of which is open to fill or empty the reservoir. A cap, e.g. a cork, is introduced in the neck to get the bottle closed for storage or transportation of the content.

In the wine sector, radio frequency identification, hereafter RFID, components have been proposed to integrate marketing functions, such as the provision of a detailed technical sheet on a bottle following the reading of the RFID component by means of a mobile device, allowing a person to make an informed purchasing choice and/or to obtain detailed information about a purchased product.

The combination of RFID components with smart sensors helps to track the life of a bottle of wine. For example, by means of a temperature sensor, it would be possible to determine whether the bottle has followed optimal storage conditions or if, on the contrary, it has been exposed to temperature variations that are not recommended for the correct maturation of a wine. Such RFID component may be integrated with the bottle label for instance.

However, such device does not allow ensuring the integrity of the content of the bottle, i.e. that the bottle has never been opened before for e.g. substituting a poor quality wine to an expected high quality one.

There is thus a need for securing the integrity of a bottle, in particular the integrity of its content.

3. SUMMARY

A particular aspect of the present disclosure relates to a device for securing a bottle's cap. Such device comprises:
- a first part;
- a second part mechanically connected to the first part through a mechanical connection; and
- a securing component comprising a radio frequency transponder, a first portion of the component being implemented in the first part of the device, a second portion of the component being implemented in the second part of the device, at least one portion of the component extending through the mechanical connection.

The second part comprises means for fixing the device to a cap of a bottle. The mechanical connection is configured for breaking when a traction or a torsion is applied on the first part of the device versus the second part.

Thus, the present disclosure proposes a new and inventive solution for securing a bottle's cap (e.g. a cork).

More particularly, the proposed device is configured in such a way that once it is fixed to the cap of the bottle, the mechanical connection between the first and second parts of the device breaks when an attempt is made for removing the device from the cap by acting on (e.g. pulling or unscrewing) the first part of the device. For instance, the first part is the only part of the device that is accessible from the exterior of the bottle when the device is correctly fixed to the cap using the means for fixing.

The breaking of the mechanical connection leads to a break of the portion of the securing component that extends through the mechanical connection. This leads to a modification of the behavior of the securing component that can be detected e.g. by interrogating the transponder (e.g. through a predetermined response to a request or through an absence of response to such request e.g. when the securing component is out of order following the break of the portion of the securing component). Such modification of the behavior of the securing component is representative of an attempt of access to the content of the bottle. The use of such device thus allows securing the bottle.

In some embodiments, the first part is configured for covering a cap for which the device is intended.

Thus, the first part prevents from accessing to the content of the bottle using e.g. a needle through the cap. For instance, the first part has a cylindrical shape with a diameter in the range of 18 mm up to 28 mm for covering the cork disposed at the free end of the neck of most standard wine bottles.

In some embodiments, the first part is designed to cover a cap and the first portion of the securing component substantially spreads all over the first part.

For instance, the first portion of the securing component comprises e.g. an antenna of the transponder (e.g. a spiral antenna) so that the transponder is no more functional when the antenna is perforated. The first portion of the securing component may also comprise a secure mesh and the electronic circuitry of the securing component is configured for detecting that a perforation has occurred e.g. by measuring the impedance of the mesh, or by detecting an open circuit. Thus, the device is able to detect an attempt to access to the content of the bottle using e.g. a needle through the cap.

In some embodiments, the first part is designed to cover a cap, and comprises at least one opening allowing the air to circulate below the first part, said openings having an orientation substantially parallel to the first part.

Thus, the content of the bottle remains in contact with fresh air even when the device is fixed to the cap, as required e.g. for maturating wines.

In some embodiments, the means for fixing comprise at least one spike for spiking the device to a cap. The at least one spike comprises means for anchorage configured for preventing the second part to be pulled off the cap when an attempt is made for pulling the device from the cap.

In some embodiments, the first part comprises at least one first pression area. The second part comprises at least one second pression area opposite to the at least one first pression area. The at least one first pression area is configured for pressing the at least one second pression area when the device is being spiked to the cap for which it is intended. The at least one first pression area is configured for not being in contact with the at least one second pression area when an attempt is made for pulling the device from the cap.

Thus, the cooperation between the first and second pression areas allows easily spiking the device to the cap while not preventing the mechanical connection from breaking when an attempt is made for removing the device from the cap by pulling the first part of the device.

In some embodiments, the means for fixing comprise at least one screw thread configured for allowing the device to be screwed to the cap for which it is intended.

In some embodiments, the at least one screw thread comprises means for anchorage configured for allowing the device to be screwed to the cap for which it is intended and for preventing the second part to be unscrewed from the cap when an attempt is made for unscrewing the device from the cap.

In some embodiments, the first part comprises at least one first stopper and the second part comprises at least one second stopper. The at least one first stopper is configured for pushing the at least one second stopper when the device is being screwed to the cap for which it is intended. The at least one first stopper is configured for not pushing the at least one second stopper when an attempt is made for unscrewing the device from the cap.

Thus, the cooperation between the first and second stoppers helps the screwing of the device while preventing the mechanical connection to break during the screwing. However, the first and second stoppers do not prevent the mechanical connection to break during the unscrewing of the device.

In some variants the first and second stoppers are further configured for breaking for a predetermined pression between them for preventing to have a too high torsion effort that could lead to a degradation of the cap while screwing the device to the cap.

In some embodiments, the securing component comprises a unique identifier.

In some embodiments, the securing component comprises a secure element implementing means for responding to a challenge according to a challenge/response pair. The response to the challenge is unique, the challenge being received by the device through a radio frequency request.

Thus, the securing component is unique and cannot be duplicated. For instance, the transponder comprises a RFID tag or a Bluetooth tag.

Another aspect of the present disclosure relates to system comprising a cap and a device according to any of the embodiment discussed above which is fixed to the cap using the means for fixing.

Another aspect of the present disclosure relates to bottle comprising a device according to any of the embodiment discussed above which is fixed to a cap of the bottle using the means for fixing.

Another aspect of the present disclosure relates to the use of a device to any of the embodiment discussed above for securing a bottle's cap.

Another aspect of the present disclosure relates to a method for securing a bottle comprising a device according to any of the embodiment discussed above which is fixed to a cap of the bottle using the means for fixing. Such method comprises:

receiving, by the radio frequency transponder, a request sent by a terminal for a unique identifier of the device; and sending, by the radio frequency transponder to the terminal, the unique identifier responsive to the receiving the request.

In some embodiments, the method comprises:

receiving, by the radio frequency transponder, a challenge sent by the terminal, the challenge belonging to a challenge/response pair wherein the response to the challenge is unique; and sending, by the radio frequency transponder to the terminal, the response responsive to the receiving the challenge.

Another aspect of the present disclosure relates to a computer program product comprising program code instructions for implementing the above-mentioned method for securing a bottle (in any of its different embodiments), when said program is executed on a computer or a processor.

Another aspect of the present disclosure relates to an apparatus comprising at least one processor or a dedicated computing machine configured for implementing the above-mentioned method for securing a bottle (in any of its different embodiments). Thus, the features and advantages of this apparatus are the same as those of the method for securing a bottle described above. Therefore, they are not detailed any further.

4. LIST OF FIGURES

Other features and advantages of embodiments shall appear from the following description, given by way of indicative and non-exhaustive examples and from the appended drawings, of which:

FIG. 1b illustrates a top view of the device of FIG. 1a;

5. DETAILED DESCRIPTION

In all of the figures of the present document, the same numerical reference signs designate similar elements and steps.

Figure 1A:
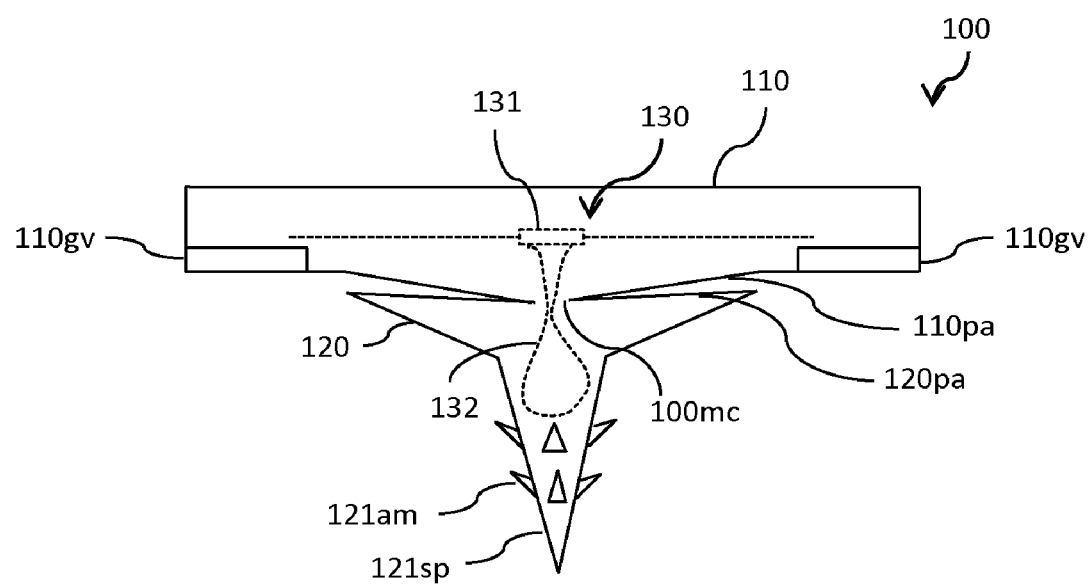
FIG. 1a illustrates a device for securing a bottle's cap according to one embodiment of the present disclosure.
Figure 1B:
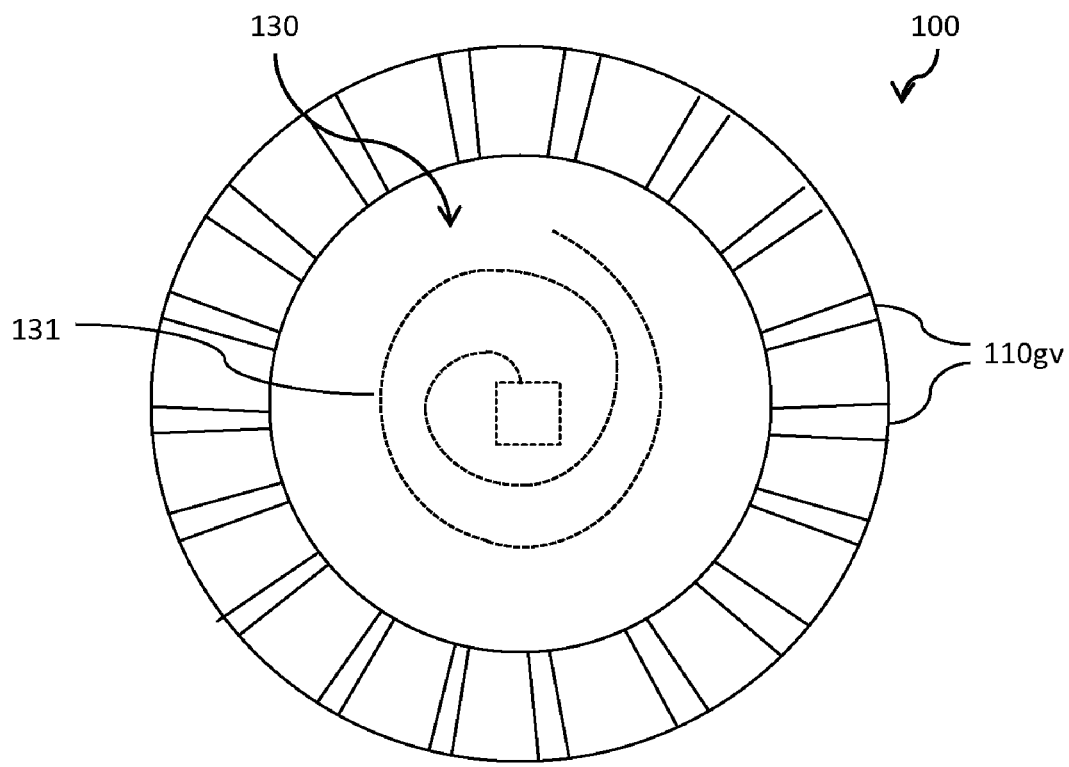
Figure 2:
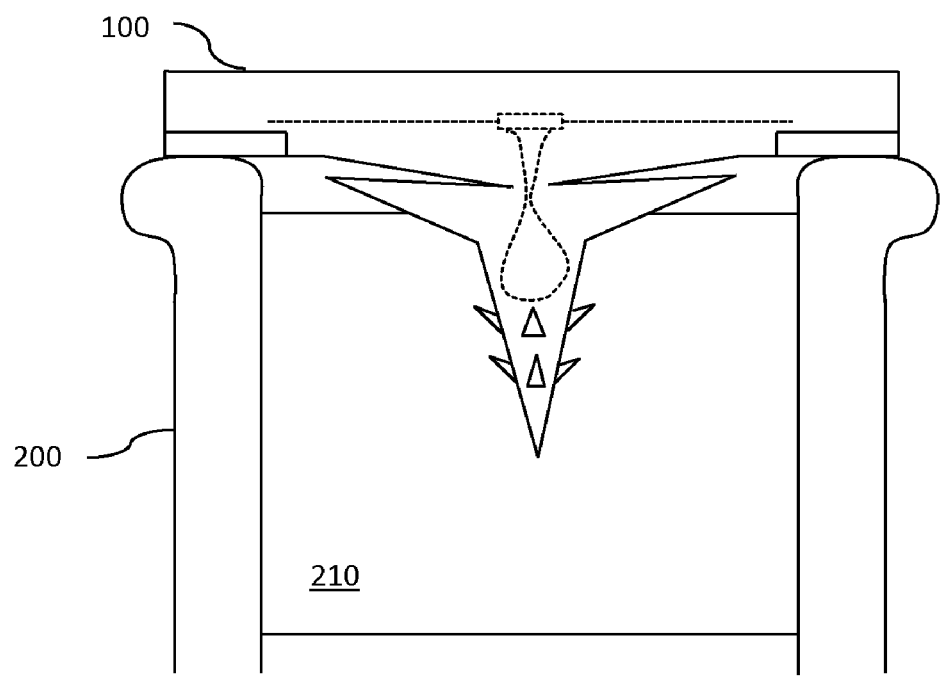
FIG. 2 illustrates a neck of a bottle comprising the device of FIG. 1a fixed to a cap of the bottle.

Referring now to FIGS. 1a and 1b, we describe a device 100 for securing a bottle's cap according to one embodiment of the present disclosure. Such device 100 is further discussed when fixed to a cap 210 for which it is intended on a bottle 200 as illustrated in FIG. 2.

More particularly, the device 100 comprises a first part 110 and a second part 120 made e.g. of plastic like PET (for "polyethylene terephthalate") or any equivalent material.

The second part 120 comprises means for fixing the device 100 to a cap 210 (e.g. a cork) of a bottle 200. In the present embodiment, the means for fixing comprise one spike 121*sp* for spiking the device 100 to the cap 210 for which it is intended. The spike 121*sp* comprises means for anchorage 121*am* configured for preventing the second part 120 to be pulled off the cap 210 when an attempt is made for pulling the device from the cap 210.

In other embodiments, the second part 120 comprises a plurality of such spikes 121*sp*.

In other embodiments, the one or more spike does not comprise such means for anchorage 121*am*.

Back to FIGS. 1*a* and 1*b*, the first part 110 and the second part 120 are mechanically connected to each other through a mechanical connection 100*mc*. In the present embodiment, the mechanical connection 100*mc*, the first part 110 and the second part 120 are made of a same material. For instance, the mechanical connection 100*mc*, the first part 110 and the second part 120 are made as a same part, e.g. through mouldering. However, even in such particular exemplary implementation, the mechanical connection 100*mc* can be identified as a distinctive area as it takes the form of a tiny part in between the first part 110 and the second part 120 that is configured for breaking when a traction is applied to the first part 110. More particularly, the mechanical connection 100*mc* is configured for breaking when an effort is applied to the first part 110 aimed to remove the device 100 from the cap 210. For instance, the mechanical connection 100*mc* is configured for breaking when an attempt is made for removing the device 100 from the cap 210 by acting on the first part 110 of the device 100 while the second part 120 of the device remains fixed to the cap 210, e.g. thanks to the means for anchorage 121*am* described above.

For instance, the first part 110 is the only part of the device 100 that is accessible from the exterior of the bottle 200 when the device is correctly fixed to the cap 210 using the means for fixing as illustrated e.g. in FIG. 2.

In other embodiments, the mechanical connection 100*mc* is a part distinct from the first part 110 and/or from the second part 120 as long as it is configured for breaking when an effort is applied to the first part 110 aimed to remove the device 100 from the cap 210.

Back to FIGS. 1*a* and 1*b*, the device 100 comprises a securing component 130 (depicted in dotted line in FIGS. 1*a*, 1*b*, 2 and 3). The securing component 130 comprises a radio frequency transponder, e.g. a RFID tag or a Bluetooth tag. For instance, the securing component 130 (and thus the device 100 consequently) is associated to a unique identifier. In that case, the securing component 130 is configured for providing the unique identifier in response to a radio frequency request received by the transponder. In some implementations, the securing component 130 comprises a secure element implementing means for responding to a challenge according to a challenge/response pair wherein the response to said challenge is unique. Such secure element guarantees code and data loaded inside to be protected with respect to confidentiality (i.e. preventing sensitive information from reaching the wrong people, close to privacy) and/or integrity (i.e; maintaining the consistency, accuracy, and trustworthiness of data over its entire life cycle) and/or authenticity (i.e. determining whether someone or something is, in fact, who or what it declares) and/or availability (i.e. maintaining a correctly functioning even if under attack)). The challenge is received e.g. through a radio frequency request received by the transponder. Thus, the securing component 130 is unique and cannot be duplicated. Those aspects are further discussed below in relation with the method of FIG. 5.

Back to FIGS. 1*a* and 1*b*, the securing component 130 comprises a first portion 131 implemented in the first part 110 of the device 100 and a second portion 132 implemented in the second part 120 of the device 100. One portion of the securing component 130 extends through the mechanical connection 100*mc*. Consequently, the breaking of the mechanical connection 100*mc* while trying to remove the device 100 from the cap 210 by pulling on the first part 110 leads to a break of the portion of the securing component 130 that extends through the mechanical connection 100*mc*. This leads to a modification of the behavior of the securing component 130 that can be detected e.g. by interrogating the transponder. For instance, the transponder can be configured for answering a predetermined response to a request when the securing component 130 detects that the portion in question is broken. Alternatively, the transponder may not answer to such request e.g. when the securing component 130 or the transponder itself is out of order following the break of the portion in question. This can be the case for instance if the portion of the securing component 130 extending through the mechanical connection 100*mc* is all or part of the antenna of the transponder. Whatever the implementation, such modification of the behavior of the securing component 130 is representative of an attempt of access to the cap 210, and thus to the content of the bottle 200 at the end. The use of such device 100 thus allows securing the bottle 200 and its content.

Back to FIGS. 1*a* and 1*b*, the first part 110 comprises one first pression area 110*pa*. The second part 120 comprises one second pression area 120*pa* opposite to the first pression area 110*pa*. More particularly, the first pression area 110*pa* is configured for pressing the second pression area 120*pa* when the device 100 is being spiked to the cap 210 for which it is intended, e.g. thanks to the deformation capability of the material the device 100 is made of. The first pression area 110*pa* is further configured for not being in contact with the second pression area 120*pa* when an attempt is made for pulling the device 100 from the cap 210 by acting on the first part 110. Accordingly, the cooperation between the first pression area 110*pa* and the second pression area 120*pa* allows easily spiking the device 100 to the cap 210 while not preventing the mechanical connection 100*mc* from breaking when an attempt is made for removing the device 100 from the cap 210 by pulling the first part 110 of the device 100.

In other embodiments, the first part 110 comprises a plurality of such first pression areas 110*pa* and the second part 120 comprises a plurality of corresponding second pression areas 120*pa*.

In other embodiments, the first part 110 does not comprise such one or more first pression areas 110*pa* and the second part 120 does not comprise such corresponding one or more second pression areas 120*pa*.

Back to FIGS. 1*a* and 1*b*, the first part 110 comprises a plurality of grooves 110*gv* located on a surface of the first part 110 configured for being opposite to the cap 210 for which it is intended when the device 100 is fixed to the cap 210. More particularly, the grooves 110*gv* extend from the exterior of the device 100 for allowing air to pass up to the cap 210 as can be understood referring to FIG. 2 for instance. Thus, the content of the bottle 200 may remain in contact with fresh air even when the device 100 is fixed to the cap 210, as required e.g. for maturating wines in a corked bottle.

In other embodiments, the first part 110 comprise only one such groove 110*gv*.

In other embodiments, the first part 110 does not comprise such one or more groove 110*gv*.

In other embodiments, the first part 110 comprises one (or more) opening allowing the air to circulate below the first part 110, i.e. for reaching the cap 210. The one (or more) opening has an orientation substantially parallel to the first part 110. More particularly, the angle between an opening direction and a surface of the first part 110 that is parallel to the cap 210 remains low enough for having a needle introduced through such opening that cannot reach the content of the bottle 200, even by going through the cap 210.

Depending on the configuration of the device 100 and of the cap 210, such angle may be for instance up to 45 degrees.

In some embodiments, the first part 110 is configured for covering the cap 210 for which the device 100 is intended as illustrated for instance in FIG. 2. Thus, the first part 110 prevents from accessing to the content of the bottle 200 using e.g. a needle through the cap 210. For instance, the first part 110 has a cylindrical shape with a diameter in the range of 18 mm up to 28 mm for covering the cap, e.g. a cork, disposed at the free end of the neck of most standard wine bottles.

In some embodiments, the first portion 131 of the securing component 130 substantially spreads all over the first part 110. For that purpose, the securing component 130 comprises one (or more) element extending substantially all over the first part 110. For instance, such element is configured for substantially covering the cap 210 for which the device 100 is intended. Such element is further configured for being damaged when an attempt is made for perforating the first part 110 for accessing to the cap 210. For example, such element may be an antenna of the transponder (e.g. a spiral antenna as illustrated in FIG. 1b) so that the transponder is no more functional when the antenna is perforated. Such element may also be a secure mesh and the electronic circuitry of the securing component 130 is configured for detecting that a perforation has occurred e.g. by measuring the impedance of the mesh, or by detecting an open circuit. Thus, the securing component 130 is able to detect an attempt to access to the content of the bottle 200 using e.g. a needle through the cap 210. The securing component 130 may be configured for reporting such attempt under request.

Figure 3:
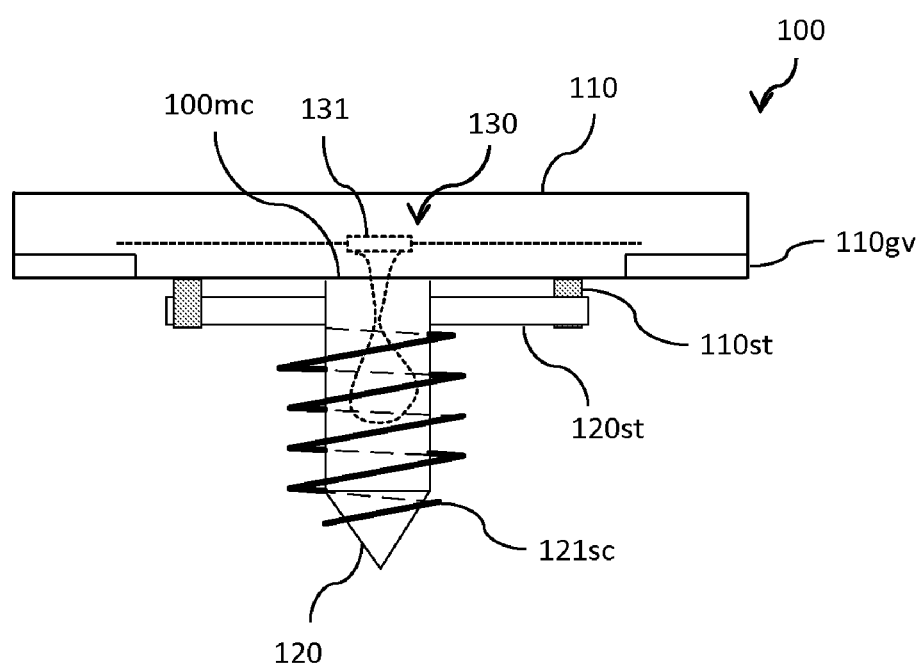
FIG. 3 illustrates a device for securing a bottle's cap according to another embodiment of the present disclosure.

Referring now to FIG. 3, we describe a device 100 for securing a bottle's cap according to another embodiment of the present disclosure.

More particularly, the embodiment of FIG. 3 differs from the embodiment of FIGS. 1a and 1b in the nature of the means for fixing. However, the other features of the device 100 discussed above in relation with FIGS. 1a and 1b (in any of the embodiments discussed above) can be implemented equally in the present embodiment.

Back to FIG. 3, the means for fixing comprise one screw thread 121sc configured for allowing the device 100 to be screwed to the cap 210 for which it is intended.

In other embodiments, the second part 120 comprises a plurality of such screw thread 121sc.

In some embodiments, the one (or more) screw thread 121sc comprises means for anchorage configured for allowing the device 100 to be screwed to the cap 210 but for preventing the second part 120 to be unscrewed from the cap 210 when an attempt is made for unscrewing the device 100 from the cap 210.

In some embodiments, the one (or more) screw thread 121sc does not comprise such means for anchorage.

Back to FIG. 3, the first part 110 comprises two first stoppers 110st. The second part 120 comprises two corresponding second stoppers 120st. The two first stoppers 110st are configured for pushing the two second stoppers 120st when the device 100 is being screwed to the cap 210 by acting on the first part 110. The two first stoppers 110st are further configured for not pushing the two second stoppers 120st when an attempt is made for unscrewing the device 100 from the cap 210 by acting on the first part 110.

Thus, the cooperation between the first stoppers 110st and the second stoppers 120st helps the screwing of the device 100 while preventing the mechanical connection 100mc to break during such screwing. However, the first stoppers 110st and the second stoppers 120st do not prevent the mechanical connection 100mc to break during the unscrewing of the device 100 by acting on the first part 110.

In some embodiments, the first stoppers 110st and the second stoppers 120st are further configured for breaking for a predetermined pression between them for preventing to have a too high torsion effort that could lead to a degradation of the cap 210, e.g. a cork, 210 while screwing the device 100 to the cap 210.

In some embodiments, the device 100 does not comprise such first stoppers 110st and second stoppers 120st.

In the embodiments of FIGS. 1a, 1b and 3, particular means for fixing are considered, i.e. means for spiking the device 100 to the cap 210 and means for screwing the device 100 to the cap 210. However, other means for fixing may be considered in other embodiments. for instance, the second part 210 may comprise a surface (e.g. a planar surface) allowing the device 100 to be glued to a corresponding surface of the cap 210.

Figure 4:
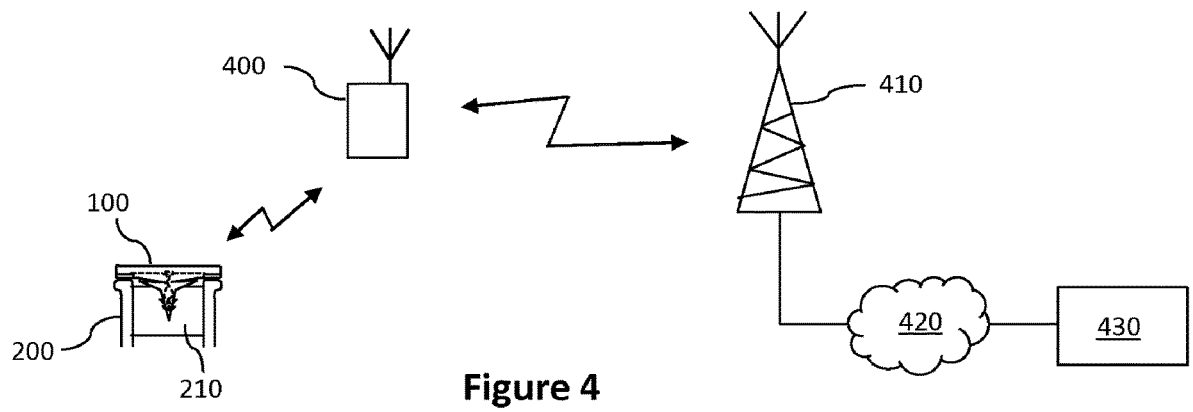
FIG. 4 illustrates the bottle of FIG. 2 wherein the device is in communication with a terminal connected to a network according to one embodiment of the present disclosure.

Referring now to FIG. 4, we describe a configuration wherein the bottle 200 with the device 100 fixed to the cap 210 is in communication with a terminal 400 connected to a server 430 according to one embodiment of the present disclosure.

More particularly, the terminal 400 (e.g. a smartphone, a tablet, a personal computer, etc.) is configured for wirelessly communicating with the radio frequency transponder of the securing component 130 (e.g. through a Bluetooth protocol, a near field communication, hereafter NFC, protocol, etc.).

The terminal 400 is further configured for communicating with a server 430 that stores e.g. information relating to devices implemented in different bottles and/or information relating to the bottles and their contents. In the present embodiment, the communication between the terminal 400 and the server 430 goes wirelessly through the base station 410 and the core network 420. For instance, the base station 410 and the core network 420 belong to a cellular network (e.g. a 2G, 3G, 4G or 5G network). In other embodiments, the communication between the terminal 400 and the server 430 goes through a wired network.

Figure 5:
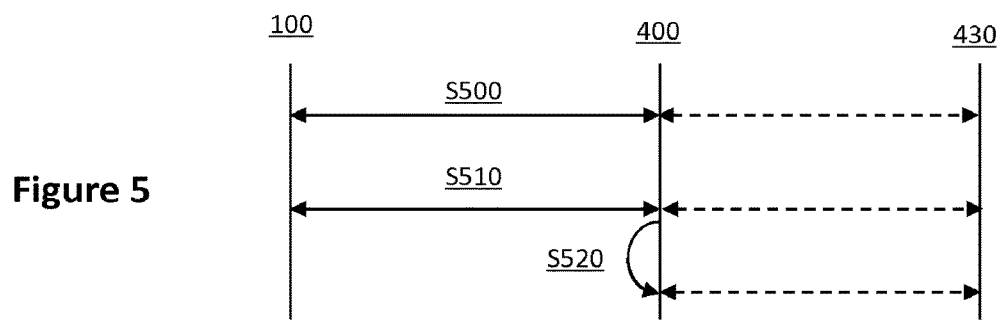
FIG. 5 illustrates the steps of a method for securing the bottle of FIG. 2 in the configuration of FIG. 4.

Referring now to FIG. 5, we describe the steps of a method for securing the bottle 200 in the configuration of FIG. 4 according to one embodiment of the present disclosure.

Depending on the considered implementation, the terminal 400 runs an application for implementing the steps of the method detailed below. Alternatively, the terminal 400 may receive an application information (e.g. a Uniform Resource Locator, hereafter URL) from the device 100 responsive to a request sent to the radio frequency transponder. Based on the application information, the terminal 400 may download the application or launch the application that runs remotely, e.g. on the server 430.

Back to FIG. 5, in a step S500, the device 100 (in any of the embodiments discussed above) receives, through its radio frequency transponder, a request sent by the terminal 400 for a unique identifier of the device 100. Responsive to the request, the device 100 provides, through its radio frequency transponder, the unique identifier to the terminal 400.

If no response is received by the terminal 400, it may be understood that the portion of the securing component 130 extending through the mechanical connection 100mc is broken (e.g. leading to having the securing component 130 or the transponder itself out of order following the break of the portion in question) and thus that there has been an attempt of accessing to the cap 210, and thus to the content of the bottle 200.

Alternatively, the device 100 may provide, in place of the unique identifier or in addition to the unique identifier, a predetermined response to the request when the securing component 130 detects that the portion in question is broken. In that case, it can also be understood that that there has been an attempt of accessing to the cap 210, and thus to the content of the bottle 200.

Back to FIG. 5, in a step S510, the device 100 receives, through its radio frequency transponder, a challenge sent by the terminal 400. Such challenge belongs to a challenge/ response pair wherein the response to the challenge is unique. Responsive to the request, the device 100 provides, through its radio frequency transponder, the response to the terminal 400. In that perspective, the securing component 130 may comprise a secure element implementing means for responding to the challenge as discussed above in relation with FIGS. 1a and 1b.

The correct response to the challenge proves the device 100 is original and has not been tampered, neither the bottle 200 has been tampered. A wrong response to the challenge proves the device 100 is not genuine and the bottle 200 may be counterfeit.

In some embodiments, the challenge is provided by the server 430 to the terminal 400 that forwards the challenge to the device 100. The terminal 400 thus forwards the response to the server 430.

In some embodiments, the step S510 is not implemented.

Back to FIG. 5, in a step S520, additional information is entered into the terminal 400, e.g. the serial number of the bottle 200 or of the label. Such additional information may be entered e.g. by a user of the terminal 400 that reads the corresponding information on the bottle 200.

The terminal 400 thus implements an authenticity confirmation for higher level security check based on the additional information.

In some embodiments, the terminal 400 forwards the additional information to the server 430 that implements the authenticity confirmation for higher level security check based on the additional information.

In some implementations, the terminal 400 supplements the additional information with geolocation information. Such geolocation information may be obtained for instance through a satellite positioning system device (e.g. of the GPS, Galileo, Beidou or Glonass type) embedded in the terminal 400 and/or in the device 100. The application in the terminal 400 may be able to collect the geolocation of the device 100 in addition to the unique identifier and/or the response to the challenge. The terminal is configured for raising a flag if the same unique identifier and/or the response to the challenge is provided by devices 100 in different places around the world at a near time (e.g. based on the time of the considered request for the unique identifier and/or for the response to the challenge) raising issues about uniqueness of the corresponding devices 100.

In some embodiments, the terminal 400 forwards the supplemented additional information to the server 430 that implements the checking that the same unique identifier and/or the response to the challenge is provided by devices 100 in different places around the world at a near time.

In some embodiments, the step S520 is not implemented.

Figure 6:
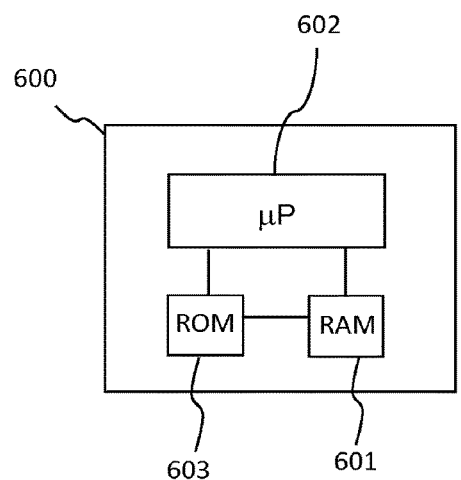
FIG. 6 illustrates the structural blocks of an exemplary device that can be used for implementing the method of FIG. 5.

Referring now to FIG. 6, we illustrate the structural blocks of an exemplary device or apparatus 600 that can be used for implementing all or part of the steps of the method for securing a bottle according to the disclosure (according to any of the embodiments disclosed above).

In an embodiment, a device 600 comprises a non-volatile memory 603 (e.g. a read-only memory (ROM), a hard disk, a flash memory, etc.), a volatile memory 601 (e.g. a random-access memory or RAM) and a processor 602. The non-volatile memory 603 is a non-transitory computer-readable carrier medium. It stores executable program code instructions, which are executed by the processor 602 in order to enable implementation of all or part of the steps of the method described above (method for securing a bottle) in the various embodiment disclosed in relationship with FIG. 5.

Upon initialization, the aforementioned program code instructions are transferred from the non-volatile memory 603 to the volatile memory 601 so as to be executed by the processor 602. The volatile memory 601 likewise includes registers for storing the variables and parameters required for this execution.

All the steps of the method for securing a bottle according to the disclosure may be implemented equally well:

by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a CD-ROM, a DVD-ROM, a USB key) or non-detachable; or by a dedicated machine or component, such as an FPGA (Field Programmable Gate Array), an ASIC (Application-Specific Integrated Circuit) or any dedicated hardware component.

In other words, the disclosure is not limited to a purely software-based implementation, in the form of computer program instructions, but that it may also be implemented in hardware form or any form combining a hardware portion and a software portion.

In some embodiments, the device 100 comprises the device 600.

In some embodiments, the terminal 400 comprises the device 600.

In some embodiments, the server 430 comprises the device 600.

The invention claimed is:

1. A device for securing a cap of a bottle, comprising:
a first part;
a second part mechanically connected to the first part through a mechanical connection; and
a securing component comprising a radio frequency transponder, a first portion of the component being implemented in said first part of the device, a second portion of the component being implemented in said second part of the device, at least one portion of the component extending through said mechanical connection,
wherein the second part comprises a fixer configured to fix the device to the cap of the bottle,
wherein said mechanical connection is configured to break when a traction or a torsion is applied on the first part of the device versus the second part when an attempt is made to remove the device from the cap by acting on the first part of the device, and
wherein said first part is designed to cover the cap, and comprises at least one opening allowing air to circulate below the first part, the at least one opening having an orientation substantially parallel to the first part.

2. The device according to claim 1, wherein said first part is configured to cover the cap for which the device is configured.

3. The device according to claim 2, wherein said first part is designed to cover the cap, said first portion of the securing component substantially spreading all over the first part.

4. The device according to claim 1, wherein said fixer comprises at least one spike for spiking the device to the cap, said at least one spike comprising an anchor configured to prevent the second part to be pulled off the cap when an attempt is made for pulling the device from the cap.

5. The device according to claim 4, wherein said first part comprises at least one first pression area and wherein said second part comprises at least one second pression area opposite to said at least one first pression area,
   said at least one first pression area being configured to process said at least one second pression area when said device is being spiked to the cap for which it is configured, and
   said at least one first pression area being configured to not be in contact with said at least one second pression area when an attempt is made to pull the device from the cap.

6. The device according to claim 1,
   wherein said fixer comprises at least one screw thread configured for allowing the device to be screwed to the cap for which it is configured.

7. The device according to claim 6,
   wherein said at least one screw thread comprises an anchor configured to allow the device to be screwed to the cap for which it is configured and to prevent the second part to be unscrewed from the cap when an attempt is made to unscrew the device from the cap.

8. The device according to claim 6,
   wherein said first part comprises at least one first stopper and said second part comprises at least one second stopper,
   said at least one first stopper being configured to push said at least one second stopper when said device is being screwed to the cap for which it is configured, and
   said at least one first stopper being configured to not push said at least one second stopper when an attempt is made to unscrew the device from the cap.

9. The device according to claim 1, wherein the securing component comprises a secure element responding to a challenge according to a challenge/response pair wherein the response to said challenge is unique, the challenge being received by the device through a radio frequency request.

10. A system comprising the cap and the device according to claim 1 fixed to said cap using said fixer.

11. A bottle comprising the device according to claim 1 fixed to the cap of said bottle using said fixer.

12. The device according to claim 1, wherein the device secures the cap of the bottle.

13. A method for securing a bottle, the bottle including a device fixed to a cap of the bottle, the device including
   a first part,
   a second part mechanically connected to the first part through a mechanical connection, and
   a securing component comprising a radio frequency transponder, a first portion of the component being implemented in said first part of the device, a second portion of the component being implemented in said second part of the device, at least one portion of the component extending through said mechanical connection,
   wherein the second part comprises fixer configured to fix the device to the cap of the bottle,
   wherein said mechanical connection is configured to break when a traction or a torsion is applied on the first part of the device versus the second part when an attempt is made to remove the device from the cap by acting on the first part of the device, and
   wherein said first part is designed to cover the cap, and comprises at least one opening allowing air to circulate below the first part, the at least one opening having an orientation substantially parallel to the first part, the method comprising:
   receiving, by said radio frequency transponder, a request sent by a terminal for a unique identifier of said device; and
   sending, by said radio frequency transponder to said terminal, said unique identifier responsive to said receiving said request.

14. The method according to claim 13, further comprising:
   receiving, by said radio frequency transponder, a challenge sent by said terminal, said challenge belonging to a challenge/response pair wherein the response to said challenge is unique; and
   sending, by said radio frequency transponder to said terminal, said response responsive to said receiving said challenge.

* * * * *